United States Patent
Kuroiwa

(10) Patent No.: US 8,953,066 B2
(45) Date of Patent: Feb. 10, 2015

(54) IMAGE FILE GENERATION DEVICE, CAMERA AND IMAGE FILE GENERATION METHOD

(71) Applicant: Nikon Corporation, Tokyo (JP)

(72) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/925,141

(22) Filed: Jun. 24, 2013

(65) Prior Publication Data

US 2013/0278794 A1    Oct. 24, 2013

Related U.S. Application Data

(63) Continuation of application No. 12/591,647, filed on Nov. 25, 2009, now abandoned.

(30) Foreign Application Priority Data

Nov. 28, 2008  (JP) .................................. 2008-304494
Oct. 23, 2009  (JP) .................................. 2009-244316

(51) Int. Cl.
 *H04N 5/222*  (2006.01)
 *H04N 1/21*  (2006.01)
 *H04N 1/32*  (2006.01)
 *H04N 5/76*  (2006.01)

(52) U.S. Cl.
 CPC .......... *H04N 5/76* (2013.01); *H04N 2201/3295* (2013.01); *H04N 1/2158* (2013.01); *H04N 1/2141* (2013.01); *H04N 1/2112* (2013.01); *H04N 1/32454* (2013.01); *H04N 2201/3288* (2013.01); *H04N 1/215* (2013.01); *H04N 1/32358* (2013.01)
 USPC .................................. 348/231.2; 348/333.01

(58) Field of Classification Search
 USPC ................ 348/231.2, 231.3, 231.7
 See application file for complete search history.

(56) References Cited

U.S. PATENT DOCUMENTS 5,640,204 A    6/1997  Tsutsui
5,905,528 A *  5/1999  Kodama ..................... 348/220.1
7,124,272 B1  10/2006  Kennedy et al.
(Continued)

FOREIGN PATENT DOCUMENTS

EP    1 993 280 A2    11/2008
JP    A 11-258669    9/1999
(Continued)

OTHER PUBLICATIONS

Apr. 12, 2011 Office Action issued in Japanese Patent Application No. 2009-244316 (with English-language translation).
(Continued)

*Primary Examiner* — Trung Diep
(74) *Attorney, Agent, or Firm* — Oliff PLC

(57) ABSTRACT

An image file generation device includes: an image file generation unit that generates an image file having stored therein a plurality of sets of image data obtained in a batch via an image sensor; and an image recording unit that records the image file into a storage medium, wherein: if the image file generation unit determines that an image file-splitting condition has been satisfied while the batch of image data is being obtained via the image sensor, the image file generation unit ends image data storage into the current image file and starts image data storage into a new image file.

13 Claims, 7 Drawing Sheets

(56) References Cited

U.S. PATENT DOCUMENTS

| | | | |
|---|---|---|---|
| 7,257,317 B2* | 8/2007 | Ohnishi | 386/230 |
| 7,433,916 B2* | 10/2008 | Satomi et al. | 709/203 |
| 7,576,773 B2* | 8/2009 | Fukushima et al. | 348/207.1 |
| 7,683,942 B2 | 3/2010 | Tsujii et al. | |
| 7,768,553 B2* | 8/2010 | Kamiya | 348/220.1 |
| 8,018,493 B2* | 9/2011 | Sakaue et al. | 348/207.2 |
| 2002/0093571 A1 | 7/2002 | Hyodo | |
| 2003/0210898 A1 | 11/2003 | Juen et al. | |
| 2005/0248561 A1 | 11/2005 | Ito et al. | |
| 2006/0265426 A1 | 11/2006 | Chen | |
| 2007/0206944 A1* | 9/2007 | Ieda | 396/287 |
| 2008/0046614 A1 | 2/2008 | Aridome et al. | |
| 2008/0181064 A1 | 7/2008 | Saito | |

FOREIGN PATENT DOCUMENTS

| | | |
|---|---|---|
| JP | A 11-266420 | 9/1999 |
| JP | A 11-341434 | 12/1999 |
| JP | A 2003-189074 | 7/2003 |
| JP | A 2005-333249 | 12/2005 |
| JP | A 2006-093986 | 4/2006 |
| JP | A 2006-253740 | 9/2006 |
| JP | A 2008-033200 | 2/2008 |

OTHER PUBLICATIONS

Nov. 16, 2010 Office Action issued in Japanese Patent Application No. 2009-244316 (with English-language translation).

Apr. 29, 2010 Search Report issued in European Patent Application No. 09177309.3.

Oct. 18, 2011 Office Action issued in Japanese Patent Application No. 2009-244316 (with English-language translation).

Dec. 6, 2012 Office Action issued in Chinese Patent Application No. 200910246397.1 (with English-language translation).

Apr. 18, 2014 Office Action issued in Chinese Patent Application No. 200910246397.1 (with translation).

Dec. 5, 2014 Office Action issued in European Application No. 09177309.3.

* cited by examiner

IMAGE FILE GENERATION DEVICE, CAMERA AND IMAGE FILE GENERATION METHOD

INCORPORATION BY REFERENCE

This is a Continuation of application Ser. No. 12/591,647 filed Nov. 25, 2009 which claims priority to Japanese Patent Application No. 2008-304494 filed Nov. 28, 2008; and Japanese Patent Application No. 2009-244316 filed Oct. 23, 2009. The disclosure of the prior applications is hereby incorporated by reference herein in its entirety.

1. Field of the Invention

The present invention relates to an image file generation device, a camera and an image file generation method.

2. Description of Related Art

Image data recording devices known in the related art include those that record a plurality of sets of image data obtained through a single photographing operation in a common image file (see, for instance, Japanese Laid Open Patent Publication No. H11-266420).

SUMMARY OF THE INVENTION

However, if numerous sets of image data are obtained through a single photographing operation, the data size of the image file may become excessively large at such an image data recording device in the related art.

According to the 1st aspect of the present invention, an image file generation device, comprises: an image file generation unit that generates an image file having stored therein a plurality of sets of image data obtained in a batch via an image sensor; and an image recording unit that records the image file into a storage medium, wherein: if the image file generation unit determines that an image file-splitting condition has been satisfied while the batch of image data is being obtained via the image sensor, the image file generation unit ends image data storage into the current image file and starts image data storage into a new image file.

According to the 2nd aspect of the present invention, in the image file generation device according to the 1st aspect, it is preferred that the image file generation unit determines that the image file-splitting condition has been satisfied when a number of sets of image data stored in the image file exceeds a predetermined value.

According to the 3rd aspect of the present invention, in the image file generation device according to the 1st aspect, it is preferred that the image file generation unit determines that the image file-splitting condition has been satisfied when a data size of the image file exceeds a predetermined data size.

According to the 4th aspect of the present invention, in the image file generation device according to the 1st aspect, it is preferred that: a FAT file system is adopted as a file system in the storage medium; the image file generation device further comprises a FAT memory where FAT information read out from a FAT area in the storage medium is stored; and the image file generation unit determines that the image file-splitting condition has been satisfied with timing with which the FAT information having been rewritten in the FAT memory while the image data are recorded into the storage medium is written back into the storage medium from the FAT memory.

According to the 5th aspect of the present invention, in the image file generation device according to the 4th aspect, it is preferred that the image file generation unit determines that the image file-splitting condition has been satisfied each time the FAT information in the FAT memory is written back into the storage medium.

According to the 6th aspect of the present invention, in the image file generation device according to the 4th aspect, it is preferred that the image file generation unit determines that the image file-splitting condition has been satisfied when the FAT information in the FAT memory has been written back into the storage medium a predetermined number of times.

According to the 7th aspect of the present invention, in the image file generation device according to any one of the 2nd through 6th aspects, it is preferred that a user is allowed to select a setting for the image file-splitting condition.

According to the 8th aspect of the present invention, in the image file generation device according to any one of the 1st through 7th aspects, it is preferred that the batch of image data is a batch of image data made up with a plurality of image data obtained through a single continuous shooting operation.

According to the 9th aspect of the present invention, in the image file generation device according to the 1st aspect, it is preferred that: the batch of image data is a batch of image data made up with a plurality of image data obtained through a single continuous shooting operation; and the image file generation unit determines that the image file-splitting condition has been satisfied when a continuous shooting speed has become lower.

According to the 10th aspect of the present invention, in the image file generation device according to the 9th aspect, it is preferred that: the image file generation device further comprises a focus adjustment unit that executes focus adjustment; and the focus adjustment unit executes focus adjustment before starting the continuous shooting operation and when the continuous shooting speed has become lower.

According to the 11th aspect of the present invention, in the image file generation device according to the 1st aspect, it is preferred that the image file generation device further comprises: a deletion unit that deletes at least one set of image data among the plurality of image data stored in the image file in response to an instruction issued by the user; and an integration unit that integrates a plurality of image files having been generated in correspondence to a batch of image data into a single image file by ensuring that the image file-splitting condition is satisfied if the deletion unit has deleted image data in an image file.

According to the 12th aspect of the present invention, a camera comprises: an image sensor that obtains image data by capturing a subject image; and an image file generation device according to any one of the 1st through 11th aspects.

According to the 13th aspect of the present invention, an image file generation method comprises: an image file generation step of generating an image file having stored therein a plurality of image data obtained in a batch via an image sensor; and an image recording step of recording the image file into a storage medium, and in the image file generation step, image data storage into a current image file is ended and image file storage into a new image file is started if an image file-splitting condition is determined to have been satisfied while the batch of image data is being obtained via the image sensor.

According to the 14th aspect of the present invention, an image file generation method comprises: a deletion step of deleting at least one set of image data among a plurality of sets of image data stored in an image file in response to an instruction issued by a user; and an integration step of integrating a plurality of image files generated in correspondence to a batch of image data into a single image file by ensuring that an image file-splitting condition is satisfied if image data have been deleted in the deletion step.

According to the 15th aspect of the present invention, a computer program product contains a program enabling a computer to execute an image file generation method according to the 13th or the 14th aspect.

DESCRIPTION OF PREFERRED EMBODIMENTS

—First Embodiment—

Figure 1:
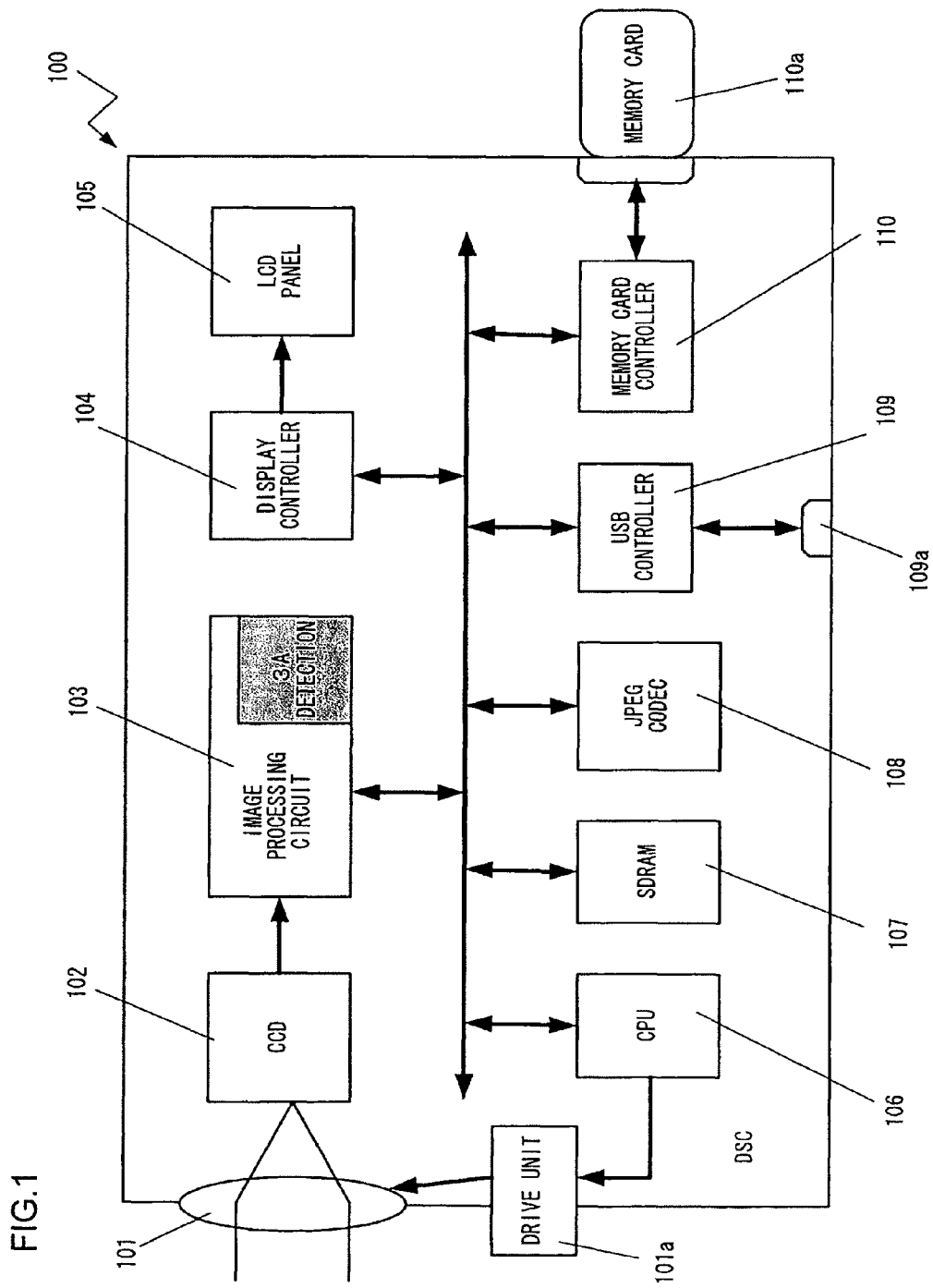
FIG. 1 is a block diagram showing the structure of the digital camera achieved in an embodiment.

FIG. 1 is a block diagram showing a structure that may be adopted in the digital still camera (DSC) achieved in the first embodiment. The digital still camera (hereafter referred to as the "digital camera") 100 includes a lens 101, a CCD 102, an image processing circuit 103, a display controller 104, an LCD panel 105, a CPU 106, an SDRAM 107, a JPEG codec 108, a USB controller 109 and a memory card controller 110.

The CPU 106 is a main controller that executes overall control for the digital camera 100. It controls the digital camera 100 by executing photographing processing, image reproduction processing, image data transfer processing and the like.

The photographing processing executed in the digital camera 100 is first described. An optical image of a subject input through the lens 101 undergoes photoelectric conversion at the CCD 102 functioning as an image sensor and is then read out. The image is then converted to digital image data at an AFE (analog front end) (not shown) and the digital image data resulting from the conversion are input to the image processing circuit 103. It is to be noted that the lens 101 includes a focusing lens (AF lens) (not shown), and as the user presses a shutter release button (not shown) halfway down, the CPU 106 drives the AF lens by controlling a drive unit 101a to adjust the focus.

Various types of image processing are executed on the digital image data input thereto at the image processing circuit 103 and the image data having undergone the image processing are recorded into the SDRAM 107. The SDRAM 107, which is a volatile memory, is used as a buffer memory where image data are temporarily recorded or as a work memory where a program is opened when the CPU 106 executes the program.

The JPEG codec 108 reads out image data recorded in the SDRAM 107, compresses the image data thus read out in the JPEG format and then records the compressed image data back into the SDRAM 107. The CPU 106 creates in the SDRAM 107 an image file (JPEG file) containing the image data having been compressed in the JPEG format (JPEG data) appended with various types of additional information (metadata). Then, the CPU 106 issued an instruction for a DMA controller (not shown) so as to transfer the JPEG file having been created to the memory card controller 110. Upon receiving the JPEG file, the memory card controller 110 records the JPEG file into a memory card 110a that is inserted in a memory card slot and is used as a storage medium. The photographing processing is thus completed.

Next, the image data reproduction processing executed in the digital camera 100 is described. The CPU 106 controls the memory card controller 110 and the DMA controller (not shown) so as to read out a JPEG file from the memory card 110a. The CPU 106 then issues an instruction for the DMA controller (not shown) so as to transfer the JPEG data in the JPEG file to the JPEG codec 108 where the JPEG data are decompressed. The decompressed image data are stored back into the SDRAM 107. Subsequently, the CPU 106 issues an instruction for the DMA controller (not shown) so as to read out the decompressed image data from the SDRAM 107 and transfers the image data thus read out to the image processing circuit 103. The image data input to the image processing circuit 103 undergo resolution conversion so as to adjust the resolution of the image in correspondence to the display resolution at the LCD panel 105 and, as a result, display image data are generated. The DMA controller (not shown) records the display image data back into the SDRAM 107.

The CPU 106 issues an instruction for the DMA controller (not shown) so as to read out the display image data from the SDRAM 107 and the display image data thus read out are transferred to the display controller 104. The display controller 104 brings up the display image data having been received on display at the LCD panel 105.

Lastly, the image data transfer processing executed at the digital camera 100 is described. It is to be noted that the following explanation is given as an example by assuming that a personal computer is connected to a USB port 109a connected to the USB controller 109 and that image data are transmitted to this personal computer.

The CPU 106 reads out a JPEG file from the memory card 110a and stores the JPEG file thus read out into the SDRAM 107 on a temporary basis by controlling the memory card controller 110 and the DMA controller (not shown). The DMA controller (not shown) then reads out the JPEG file from the SDRAM 107 and transfers the JPEG file to the USB controller 109. The USB controller 109, in turn, transmits the JPEG file received thereat to the personal computer connected to the USB port 109a.

If the user issues an instruction for a continuous shooting operation and a plurality of sets of JPEG data are generated in a batch through the single continuous shooting operation as a result, the plurality of sets of JPEG data having been generated are stored together in a single image file in the digital camera 100 achieved in the embodiment. In other words, the CPU 106 creates an image file having recorded therein a plurality of sets of JPEG data. In the description of the embodiment, an image file containing a plurality of sets of JPEG data recorded therein as described above is referred to as a multiple image file.

Figure 2B:
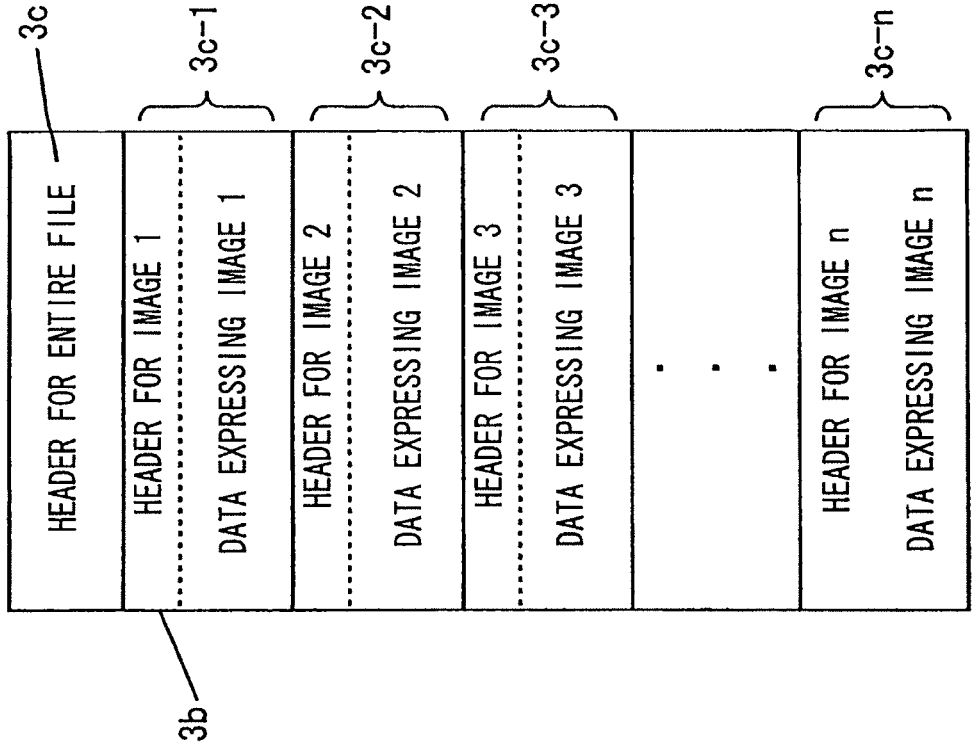
FIGS. 2A and 2B schematically illustrate data structures that may be assumed in multiple-image files.
Figure 2A:
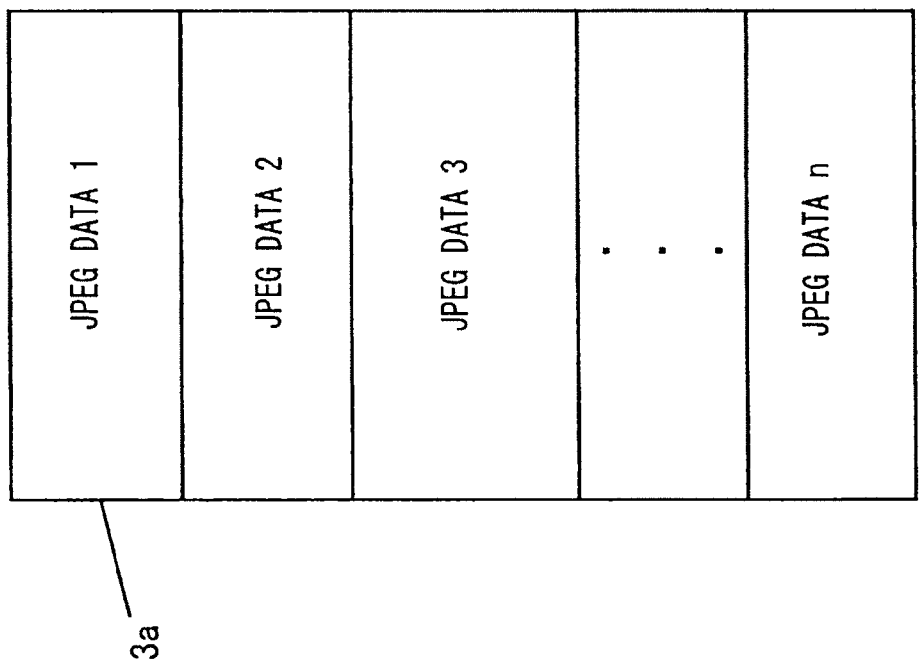

FIG. 2 schematically illustrates data structures of multiple image files. A multiple image file may adopt a data structure such as that of an image file 3a in FIG. 2A with a plurality of sets of JPEG data 1 through n recorded therein. A multiple image data file may instead adopt a data structure such as that shown in FIG. 2B. An image file 3b in the example presented in FIG. 2B includes header information 3c for the entire image file 3b, recorded at the head of the image file 3b.

Following the header information 3c, data equivalent to the first image file, i.e., a header information/image data set 3c-1, through data equivalent to the nth image file, i.e., a header information/image data set 3c-n, are recorded in sequence.

Figure 3:
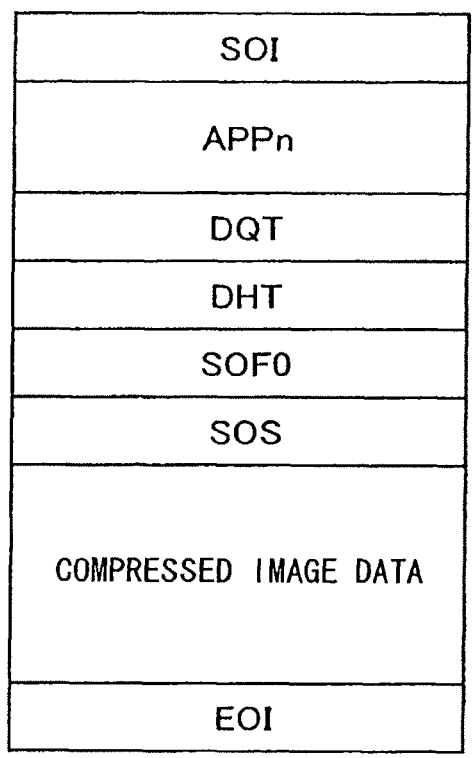
FIG. 3 schematically illustrates the data structure of JPEG data.

Namely, assuming n images have been obtained through a continuous shooting operation, n sets of JPEG data are recorded in the single image file in the example presented in FIG. 2A, whereas n sets of image data are recorded in the single image file in the example presented in FIG. 2B. It is to be noted that each set of JPEG data recorded in the image file in FIG. 2A assumes a standard data structure such as that shown in FIG. 3.

In principle, the CPU 106 executes control so as to record a plurality of sets of JPEG data obtained through each continuous shooting operation into a single image file. However, if no limit is set with regard to the number of sets of JPEG data that can be recorded in a given image file, the data size of the image file may become excessively large. In such a case, the user may later find the image file too large to handle with ease. Accordingly, a specific upper limit (an image file-splitting condition), e.g., 100, is set to the number of sets of JPEG data that can be recorded into a single image file in the embodiment, and if the continuous shooting operation is carried on after taking 100 photographs, the CPU 106 creates another image file to split this single image.

Namely, the CPU 106 executes control so that if the number of photographs obtained through the continuous shooting operation exceeds 100, the first image file is closed upon recording the JPEG data of the 100th image and the JPEG data for the 101st image and subsequent images are recorded into a second image file that is created separately. Likewise, if the number of photographs taken through the continuous shooting operation exceeds 200, the CPU 106 closes the second image file upon recording the JPEG data of the 200th image and records the JPEG data for the 201st image and subsequent images into a newly created third image file. By repeatedly executing this process, image files can be created without allowing their data sizes to become excessively large even when a great number of photographs are taken through a continuous shooting operation.

It is to be noted that when a plurality of multiple image files is created in correspondence to a single continuous shooting operation, the CPU 106 ensures that each of the plurality of multiple image files created in correspondence to the continuous shooting operation can be identified as a multiple image file belonging to a group of multiple image files created for the particular continuous shooting operation. For this purpose, the CPU 106 may record link information for the multiple image files having been created in correspondence to the single continuous shooting operation, into the individual multiple image files as meta-information. As an alternative, the file names appended to the individual multiple image files may include a common data string so as to allow the multiple image files to be identified as image files having been created through a single continuous shooting operation. As a further alternative, the file names appended to the individual multiple image files may include sequence numbers so as to allow the multiple image files to be identified as image files having been created through a single continuous shooting operation.

Figure 4:
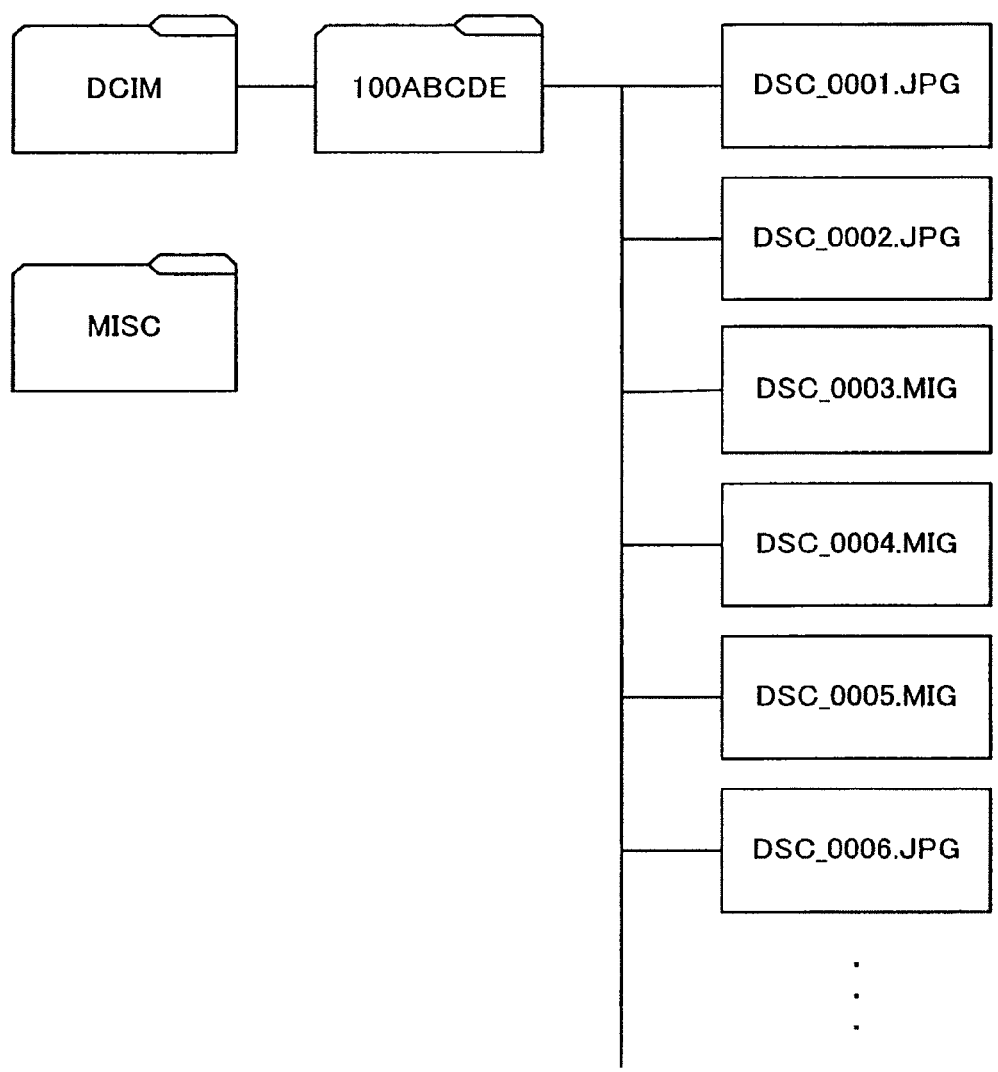
FIG. 4 schematically illustrates the folder structure assumed in a memory card.

FIG. 4 illustrates how image files may be recorded in the memory card 110a. It is to be noted that the memory card 110a will normally be formatted in the FAT file system, and that image files will, therefore, be recorded as FAT system files. In the example presented in FIG. 4, image files, each appended with a file name, are recorded in a "100 ABCDE" folder within a "DCIM" folder. A file with an extension ".JPG" in FIG. 4 is a standard JPEG file, whereas a file with an extension ".MIG" in FIG. 4 is a multiple image file having been described earlier.

Namely, within the "100 ABCDE" folder in FIG. 4, three JPEG files, i.e., "DSC_0001.JPG", "DSC_0002.JPG" and "DSC_0006.JPG", and three multiple image files, i.e., "DSC_0003.MIG", "DSC_0004.MIG" and "DSC_0005.MIG", are recorded.

Figure 5:
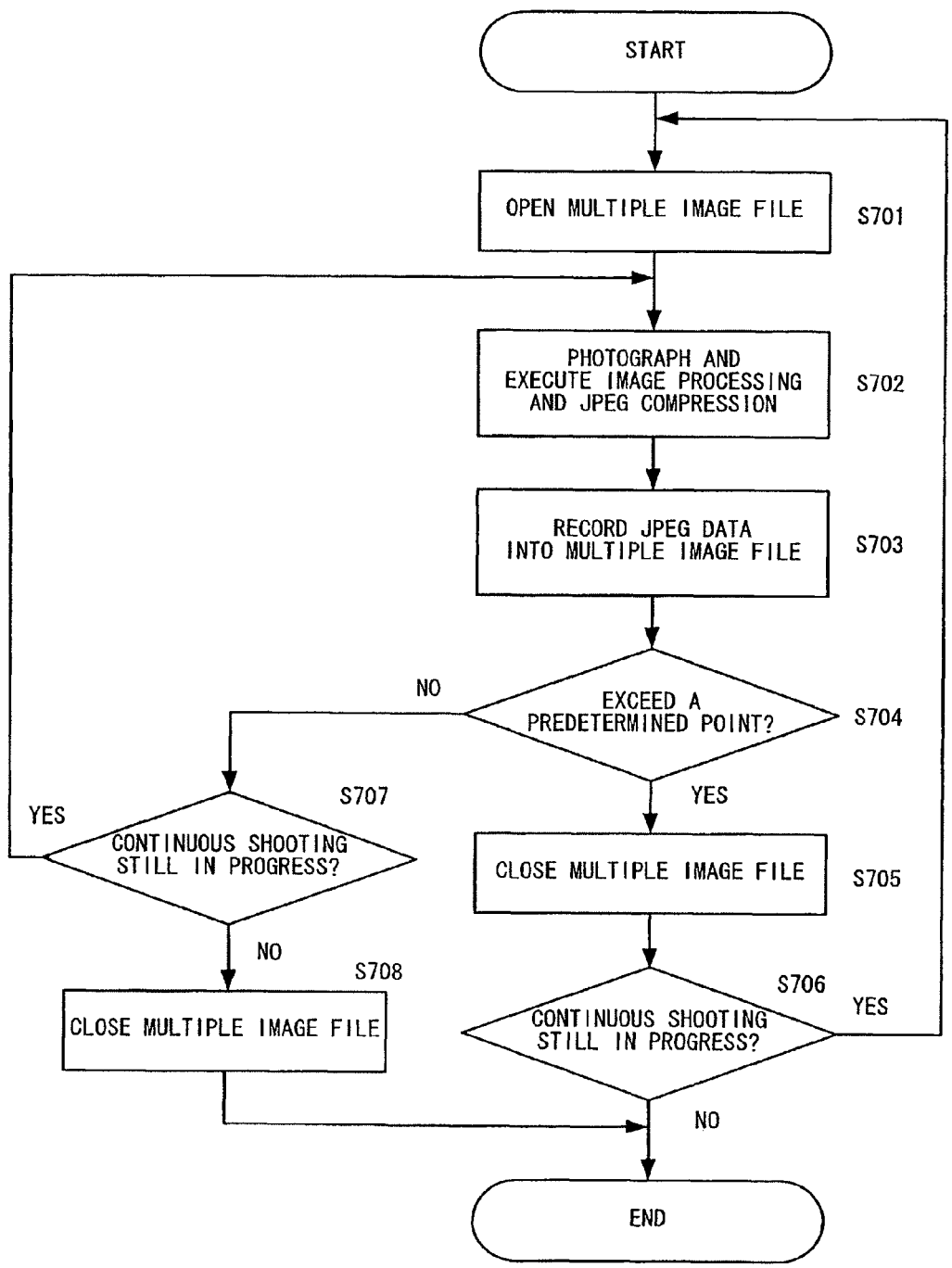
FIG. 5 presents a flowchart of the processing executed in the digital camera 100.

FIG. 5 presents a flowchart of the processing executed in the digital camera 100 in the first embodiment. The processing in FIG. 5 is executed by the computer CPU 106 based upon a program that is started up in response to a continuous shooting instruction issued by the user. The program is stored in a non-volatile memory (not shown) within the CPU 106.

Provided that the non-volatile memory allows data overwrite, the program may be procured from an external source outside the digital camera 100. In such a case, the program may be obtained via the memory card 110a, i.e., a storage medium (recording medium), where it is installed in a predetermined format. As an alternative, the program may be provided via a personal computer connected to the USB controller 109. The program, installed in a recording medium such as a CD-ROM or a DVD, may be obtained via the personal computer, or the program may be obtained as a data signal transmitted through a communication network such as the Internet. In other words, the program, provided as a computer-readable computer program product assuming any of various modes, such as a recording medium and a data signal (carrier wave), can be loaded into the digital camera 100.

In step S701, the CPU 106 creates a blank multiple image file and opens the multiple image file thus created so as to allow JPEG data, to be obtained through a continuous shooting operation, to be recorded therein. Subsequently, the operation proceeds to step S702, in which image signals obtained through a photographing operation executed as described earlier and output from the CCD 102 undergo the image processing at the image processing circuit 103 and JPEG data are created through JPEG compression executed at the JPEG codec 108, before the operation proceeds to step S703.

In step S703, the CPU 106 records the JPEG data having been created in step S702 into the multiple image file having been opened in step S701. The operation then proceeds to step S704. In step S704, the CPU 106 makes a decision as to whether or not the number of sets of JPEG data having been recorded into the multiple image file in the open state has exceeded a predetermined number, e.g., whether or not the number of sets of JPEG data recorded in the multiple image file has reached 100. If a negative decision is made in step S704, the operation proceeds to step S707.

In step S707, the CPU 106 makes a decision as to whether or not the continuous shooting operation is still in progress. For instance, the CPU 106 may determine that the continuous shooting operation is still in progress if the shutter release button is still being held all the way down and may determine that the continuous shooting operation has ended if the shutter release button, previously held all the way down, has been released. If an affirmative decision is made in step S707, the operation returns to step S702 to repeatedly execute the processing described above. If a negative decision is made in step S707, the operation proceeds to step S708. In step S708, the CPU 106 closes the currently open multiple image file thereby terminating recording of the JPEG data into the multiple image file and then the CPU 106 ends the processing.

If an affirmative decision is made in step S704, the operation proceeds to step S705. In step S705, the CPU 106 closes the currently open multiple image file, thereby terminating recording of the JPEG data into the multiple image file. As a result, it is ensured that the number of sets of JPEG data recorded into each multiple image file never exceeds a predetermined number, e.g., 100. Subsequently, the operation proceeds to step S706 in which the CPU 106 makes a decision as to whether or not the continuous shooting operation is still in progress. If an affirmative decision is made in step S706, the operation returns to step S701 to open a new multiple image file. If a negative decision is made in step S706, the processing ends.

In the first embodiment described above, the CPU 106 creates a single multiple image file containing a batch of JPEG data obtained through the same continuous shooting operation. Even while the continuous shooting operation is in progress, the CPU 106 closes the current multiple image file once the number of sets of JPEG data in the image file exceeds a predetermined number, e.g., 100 and opens a new multiple image file so as to record the JPEG data over separate multiple image files. As a result, an advantage is achieved in that the data size of a multiple image file never becomes excessively large.

—Second Embodiment—

In the first embodiment described above, the CPU 106 closes the current multiple image file and opens a new multiple image file once the number of sets of JPEG data recorded in the current multiple image file exceeds a predetermined number, e.g., 100, even while the continuous shooting operation is in progress. Then, any JPEG data obtained subsequently are recorded into the new multiple image file, so as to ensure that the data size of a multiple image file never becomes excessively large.

In the second embodiment, the CPU 106 closes the current multiple image file and opens a new multiple image file once the data size of the current multiple image file becomes equal to or greater than a predetermined size (an image file-splitting condition), e.g., equal to or greater than 100 MB, while the continuous shooting operation is in progress. Through these measures, it is ensured, as in the first embodiment, that the data size of a multiple image file never becomes excessively large. It is to be noted that since the description of the first embodiment having been given in reference to FIGS. 1 through 4 also applies to the second embodiment, a repeated explanation is not provided.

The processing executed by the CPU 106 in the second embodiment is now described in reference to the flowchart presented in FIG. 5. It is to be noted that steps in which processing identical to that in the first embodiment is executed among the steps in FIG. 5 are not described and that the following explanation focuses on the features differentiating the second embodiment from the first embodiment.

In step S704, the CPU 106 makes a decision as to whether or not the data size of the multiple image file exceeds a predetermined point, i.e., whether or not the data size of the multiple image file is equal to or greater than a predetermined size of for instance, 100 MB. If a negative decision is made in step S704, the operation proceeds to step S707. However, if an affirmative decision is made in step S704, the operation proceeds to step S705 in which the CPU 106 closes the currently open multiple image file.

Even while the continuous shooting operation is in progress, the CPU 106 in the second embodiment described above closes the current multiple image file once the data size of the multiple image file exceeds a predetermined size, e.g., 100 MB, and opens a new multiple image file so as to record the JPEG data over separate multiple image files. As a result, an advantage is achieved in that the data size of a multiple image file never becomes excessively large.

—Third Embodiment—

The CPU 106 in the third embodiment closes the current multiple image file and opens a new multiple image file once the continuous shooting speed becomes lower while the continuous shooting operation is in progress. Through these measures, it is ensured, as in the first and second embodiment, that the data size of a multiple image file never becomes excessively large. In addition, since the new multiple image file is opened with the timing with which the continuous shooting speed has become low, the processing for opening the new multiple image file, which may require a significant length of time, can be executed without greatly affecting the continuous shooting speed. It is to be noted that since the description of the first embodiment having been given in reference to FIGS. 1 through 4 also applies to the third embodiment, a repeated explanation is not provided.

The continuous shooting speed of the continuous shooting operation in progress may be lowered as the buffer becomes full of data awaiting processing, creating a time interval during which the operation waits for the buffer to become available. The embodiment is now described in reference to FIG. 6 by citing a specific instance in which the continuous shooting speed of a continuous shooting operation in progress becomes lower.

FIG. 6A illustrates the flow of data through which JPEG data are created based upon image signals (CCD data) input from the CCD 102. As shown in FIG. 6A, the CCD data first undergo a pre-process (primarily correction processing) at the image processing circuit 103 and are then recorded into a RAW buffer area 107a allocated within the SDRAM 107. Through the preprocess, AWB (auto white balance) detection is executed in correspondence to the individual fields and AWB evaluation values calculated in units of the individual fields are later totaled and are thus converted to an AWB evaluation value for each frame.

Once all the field image data are recorded into the RAW buffer area 107a, the image processing circuit 103 executes a post-process (primarily color processing) which includes color interpolation by reading out the field image data line by line in sequence. The image processing circuit 103 records the image data having undergone the post-process (YUV data) into a YUV buffer area 107b. It is to be noted that, as shown in FIG. 6B, the YUV buffer area 107b is made up with three areas, i.e., an area 107b-1 where the main image data are recorded, an area 107b-2 where display image data are recorded and an area 107b-3 where thumbnail image data are recorded.

The JPEG codec 108 reads out the YUV data from the YUV buffer area 107b and compresses the YUV data in the JPEG format, thereby creating JPEG data. The JPEG data thus created are then recorded into a JPEG buffer area 107c. As the CPU 106 records into the memory card 110a an image file (JPEG file) generated by appending metadata onto the JPEG data recorded in the JPEG buffer area 107c, the photographing processing is completed. Under these circumstances, the CPU 106 in the embodiment stores a plurality of JPEG images into a single image file as has been described in reference to the first and second embodiment.

Since the numbers of sets of image data that can be recorded into the RAW buffer area 107a, the YUV buffer area 107b and the JPEG buffer area 107c are limited, a wait period during which the operation waits for a given buffer having become full to become available again, tends to occur. For instance, the buffer capacity at the RAW buffer area 107a, the buffer capacity at the YUV buffer area 107b and the buffer capacity at the JPEG buffer area 107c in FIG. 6A may be respectively two image frames, two image frames and five image frames.

In this situation, a wait period occurs as described below, assuming that frame rate at the CCD is 2 fps, that the processing rate of the post-process and the JPEG compression is 2 fps and that the recording rate at which data are recorded into the memory card is 1 fps. Namely, while JPEG data equivalent to two frames are recorded each second into the JPEG buffer area 107b, only a single frame of image data can be recorded per second into the memory card. Thus, the JPEG buffer area 107c accumulates one frame of JPEG data every second and 5 seconds after the continuous shooting start, the JPEG buffer area 107c with the five-frame capacity becomes full.

Once the JPEG buffer area 107c becomes full, as described above, the JPEG codec 108 is no longer able to output JPEG data to the JPEG buffer area 107c. Thus, the JPEG codec 108 is forced to suspend the JPEG compression processing until space equivalent to a single image frame becomes available in the JPEG buffer area 107c. Once the JPEG codec 108 suspends the JPEG compression processing as described above, the YUV data recorded in the YUV buffer area 107b are no longer read by the JPEG codec 108 and consequently, the YUV buffer area 107b, too, becomes full.

In this situation, the image processing circuit 103 is no longer able to output YUV data to the YUV buffer area 107b and the image processing circuit 103 is thus forced to suspend the post-process until space equivalent to a single image frame becomes available in the YUV buffer area 107b. While the image processing circuit 103 suspends the post-process as described above, the image data recorded in the raw buffer area 107a cannot be read by the image processing circuit 103 and thus, the raw buffer area 107a also becomes full.

If the RAW buffer area 107a becomes full, the image processing circuit 103 is forced to suspend execution of the preprocess and, as a result, the CCD 102 can no longer output image signals to the image processing circuit 103. Consequently, the continuous shooting operation must be suspended until space equivalent to a single image frame becomes available in the RAW buffer area 107a.

Figure 6:
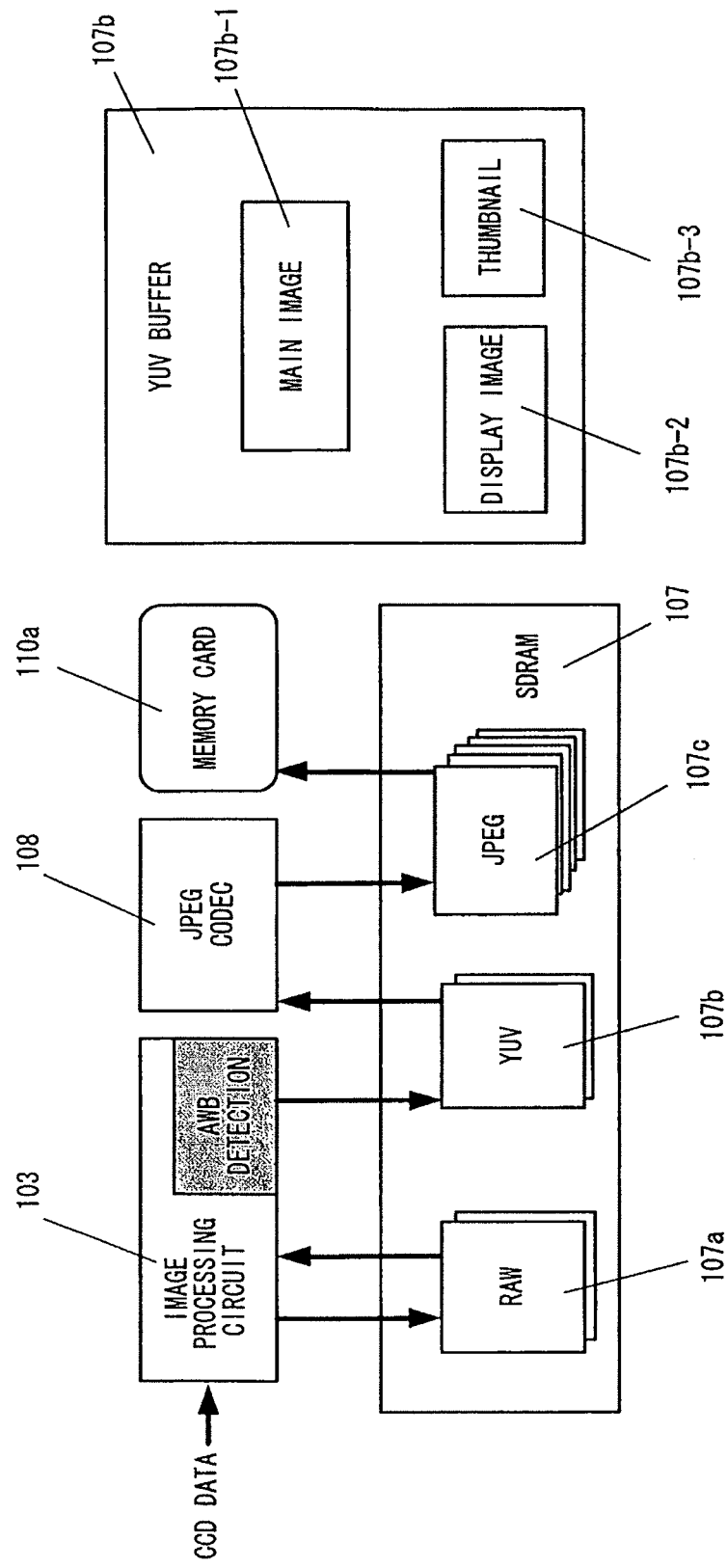
FIGS. 6A and 6B illustrate how image data flow during a photographing operation.

As described above, the buffer areas become full sequentially in the order of the JPEG buffer area 107c, the YUV buffer area 107b and the RAW buffer area 107a in the example presented in FIG. 6. Ultimately, the continuous shooting operation will be executed each time space equivalent to a single image frame becomes available in the RAW buffer area 107a and thus, the continuous shooting speed will become dependent upon the lowest processing rate, i.e., the recording rate at which data are recorded into the memory card. Namely, even if the continuous shooting operation is initially executed at a continuous shooting speed matching the CCD frame rate of 2 fps, the continuous shooting speed will subsequently be lowered to 1 fps, i.e., the recording rate at which data are recorded into the memory card once all the buffer areas become full.

In the embodiment, the current multiple image file is closed and a new multiple image file is opened with the timing with which the continuous speed has become lower, as described above. Thus, while a certain length of time is required to close the currently open multiple image file and open a new multiple image file, the extent to which the continuous shooting speed is lowered for the multiple image file switch-over can be minimized by executing the multiple image file close/open processing with the timing with which the continuous shooting speed has become lower.

The processing executed by the CPU 106 in the third embodiment is now described in reference to the flowchart presented in FIG. 5. It is to be noted that steps in which processing identical to that in the first embodiment is executed among the steps in FIG. 5 are not described and that the following explanation focuses on the features differentiating the third embodiment from the first embodiment.

In step S704, the CPU 106 makes a decision as to whether or not the continuous shooting speed has reached a predetermined point, i.e., whether or not the continuous shooting speed has become lower (whether or not the buffer areas have become full). If a negative decision is made in step S704, the operation proceeds to step S707. However, if an affirmative decision is made in step S704, the operation proceeds to step S705 in which the CPU 106 closes the currently open multiple image file.

The following advantages are achieved through the third embodiment described above.

(1) If the continuous shooting speed of a continuous shooting operation in progress becomes lower, the CPU 106 closes the current multiple image file and opens a new multiple image file so as to record the image data over a plurality of separate image files. As a result, the data size of a multiple image file never becomes excessively large.

(2) In addition, since a separate multiple image file is opened with the timing with which the continuous shooting speed has become lower, the extent to which the continuous shooting speed is lowered due to the time required for the switch-over processing for closing the currently open multiple image file and opening a new multiple image file can be minimized.

—Fourth Embodiment—

In the fourth embodiment, when recording a multiple image file into the memory card 110a assuming the FAT file system during a continuous shooting operation, the current multiple image file is closed and a new multiple image file is opened in correspondence to the timing with which FAT information within a FAT memory (not shown) in the digital camera 100 is written back into the memory card 110a. Through these measures, too, it is ensured, as in the preceding embodiments, that the data size of a multiple image file never becomes excessively large. It is to be noted that since the description of the first embodiment having been given in reference to FIGS. 1 through 4 also applies to the fourth embodiment, a repeated explanation is not provided.

A FAT area, to be used as an area where FAT information, i.e., management data, is recorded, is allocated in the memory card 110a adopting the FAT file system. The FAT information includes information indicating the cluster numbers of clusters where image file data are recorded, the cluster numbers of unused clusters and the cluster numbers of defective clusters. In addition, the digital camera 100 is equipped with a FAT memory used for FAT information overwrite as FAT information in the memory card is read out, information indicating the cluster number of a cluster where data have been recorded is written into the FAT information having been read out and the like when, for instance, recording data such as image file data in a multiple image file into the memory card 110a. Namely, when writing data such as a multiple image file into the memory card 110a, the CPU 106 first needs to read the FAT information in the FAT area of the memory card 110a into the FAT memory, rewrites the FAT information in the FAT memory and then write the FAT information back into the FAT area of the memory card 110a.

The FAT area allocated in the memory card 110a, in which numerous clusters are present, normally has a greater size than the FAT memory in the digital camera 100. For this reason, not all the data in the FAT area can be read out into the FAT memory at once. Accordingly, the CPU 106 needs to copy FAT information stored in part of the FAT area in the memory card 110*a*, e.g., the FAT information in an area A or the FAT information in an area B, read (Read) the copied FAT information into the FAT memory 7*a*, update the FAT information having been read out and then write (Write) the updated information back into the FAT area in the memory card 110*a*, as illustrated in FIG. 7.

Figure 7:
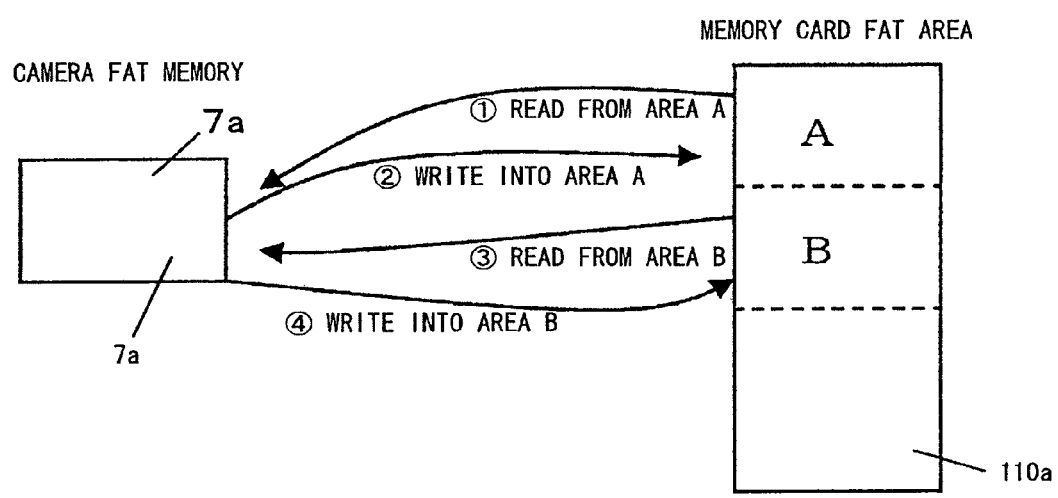
FIG. 7 schematically illustrates how FAT information in the memory card is read out to the FAT memory and how FAT information in the FAT memory is written back into the memory card.

In the example presented in FIG. 7, the FAT information in the area A, i.e., part of the FAT area in the memory card 110*a*, is first read out to the FAT memory 7*a*, a data write is executed to write the entire FAT information originating from the area A and then the FAT information is written back into the memory card 110*a*. Subsequently, the FAT information in the area B, i.e., the next portion of FAT information from another part of the FAT area, is read out into the FAT memory 7*a*, a data write is executed to write this FAT information in its entirety in a similar manner and then the FAT information is written back into the memory card 110*a*.

During this process, the CPU 106 closes the current multiple image file and opens a new multiple image file with the timing of each FAT information write-back from the FAT memory 7*a* into the memory card 110*a*. Thus, assuming that the memory capacity of the FAT memory 7*a* in the digital camera 100 allows the FAT information required for, for instance, 250 MB data management to be recorded therein (read into) at once, the FAT information is written back with the timing with which the 256 MB data having been recorded into the memory card 110*a* and, as a result, the data size of the multiple image file never exceeds 256 MB. Likewise, if the memory capacity of the FAT memory 7*a* in the digital camera 100 allows the FAT information required for, for instance, 512 MB data management to be recorded therein (read into) at once, the data size of the multiple image file never exceeds 512 MB. In either case, it is ensured that the data size of a multiple image file never becomes excessively large.

As an alternative, the CPU 106 may close the current multiple image file and open a new multiple image file with the timing with which FAT information write-back from the FAT memory 7*a* into the memory card 110*a* has been executed a predetermined number of times. For instance, a target size for each multiple image file may be set in advance and the current multiple image file may be closed with the write-back timing with which the size of the multiple image file comes closest to the target size after writing back FAT information from the FAT memory 7*a* into the memory card 110*a* multiple times. Through these measures, the multiple image file is closed once its data size becomes close to the predetermined target size and thus, it is ensured that the data size of a multiple image file never becomes excessively large. It is to be noted that the target size may be a permanently fixed size or the user may be allowed to select any target size.

In more specific terms, if the target size for each multiple image file is 800 MB and the memory capacity of the FAT memory 7*a* in the digital camera 100 allows the FAT information needed for 256 MB data management to be recorded therein, the current multiple image file is closed once the FAT information write-back has been executed three times, i.e., with the timing with which 756 MB data have been written into the memory card through three FAT information writebacks. If the memory capacity of the FAT memory 7*a* in the digital camera 100 allows the FAT information needed for 128 MB data management to be recorded therein, the current multiple image file is closed once the FAT information writeback has been executed seven times, i.e., with the timing with which 896 MB data have been written into the memory card. In addition, if the memory capacity of the FAT memory 7*a* in the digital camera 100 allows the FAT information needed for 512 MB data management to be recorded therein, the current multiple image file is closed once the FAT information writeback has been executed seven times, i.e., with the timing with which 1024 MB data have been written into the memory card.

The processing executed by the CPU 106 in the fourth embodiment is now described in reference to the flowchart presented in FIG. 5. It is to be noted that steps in which processing identical to that in the first embodiment is executed among the steps in FIG. 5 are not described and that the following explanation focuses on the features differentiating the fourth embodiment from the first embodiment.

In step S704, the CPU 106 makes a decision as to whether or not the continuous shooting speed has reached a predetermined point, i.e., whether or not FAT information in the FAT memory 7*a* has been written back into the memory card 110*a*. If a negative decision is made in step S704, the operation proceeds to step S707. However, if an affirmative decision is made in step S704, the operation proceeds to step S705 in which the CPU 106 closes the currently open multiple image file.

The following advantages are achieved through the fourth embodiment described above.

(1) The CPU 106 closes the current multiple image file to spit the file each time FAT information in the FAT memory 7*a* is written back into the memory card 110*a*. As a result, it is ensured that the data size of a multiple image file never becomes excessively large.

(2) The CPU 106 closes the current multiple image file to spit the file when writing the FAT information in the FAT memory 7*a* back into the memory card 110*a* has been carried out a predetermined number of times, by which the data size of the multiple image file becomes close to a target size. Consequently, it is ensured that each multiple image file assumes a data size close to the target size and that the data size never becomes excessively large.

—Variations—

It is to be noted that the digital camera achieved in the embodiments described above allows for the following variations.

(1) In the first embodiment described above, the CPU closes the current multiple image file and opens a new multiple image file if the number of sets of JPEG data recorded in the multiple image file would otherwise exceed a predetermined value, e.g., 100, while a continuous shooting operation is in progress. However, the present invention is not limited to this example and the user may be allowed to select any value as the maximum number of sets of JPEG data that can be written into a single multiple image file.

(2) In the second embodiment described above, the CPU 106 closes the current multiple image file and opens a new multiple image file once the data size of the multiple image file becomes equal to or greater than a predetermined size, e.g., 100 MB, while a continuous shooting operation is in progress. However, the present invention is not limited to this example and the user may be allowed to select any data size as the maximum data size each multiple image file may assume.

(3) In the third embodiment described above, the CPU 106 closes the current multiple image file and opens a new multiple image file once the continuous shooting speed becomes lower while a continuous shooting operation is in progress. As an alternative, the CPU 106 may close the current multiple image file, open a new multiple image file and execute focus adjustment processing (AF processing) with the multiple image file close/open timing once the continuous shooting speed has become low. In the continuous shooting mode selected for continuous shooting operation, the CPU 106 may execute focus adjustment by executing the AF processing with the timing with which the user has pressed the shutter release button halfway down and may subsequently start the continuous shooting operation with the timing with which the user has pressed the shutter release button all the way down. Under these circumstances, by executing the AF processing again with the timing with which the continuous shooting speed has become lower, the CPU 106 will be able to obtain well-focused sequential images even if the subject does not remain stationary during the continuous shooting operation. While the AF processing requires a certain length of time to execute, the extent to which the continuous shooting speed is lowered on account of the AF processing can be minimized by executing the AF processing with the timing with which the continuous shooting speed has become lower. It is to be noted that the AF processing is executed by adopting the contrast method or the phase difference method of the known art.

(4) In the first embodiment, a plurality of sets of JPEG data are recorded into a single multiple image file and once the number of sets of JPEG data exceeds 100 while the continuous shooting operation is in progress, a separate multiple image file is created so as to ensure that the data size of a multiple image file never becomes excessively large. The file system in the embodiment may further allow the user to delete any JPEG data in a multiple image file. As the user deletes some JPEG data in multiple image files, a plurality of multiple image files may be integrated, as long as the number of sets of JPEG data recorded in any single multiple image file does not exceed 100. For instance, a first multiple image file containing 100 sets of JPEG data and a second multiple image file containing 20 sets of JPEG data may be generated through a single continuous shooting operation. Under these circumstances, if 20 or more sets of JPEG data in the first multiple image file are deleted, a single multiple image file may be created by integrating the first multiple image file and the second multiple image file.

(5) In the second embodiment, a plurality of sets of JPEG data are recorded into a single multiple image file and once the data size of the multiple image file exceeds 100 MB while the continuous shooting operation is in progress, a separate multiple image file is created so as to ensure that the data size of a multiple image file never becomes excessively large. The file system in the embodiment may further allow the user to delete any JPEG data in a multiple image file. As the user deletes some JPEG data in multiple image files, a plurality of multiple image files may be integrated, as long as the data size of any single multiple image file does not exceed 100 MB. For instance, a first multiple image file assuming a data size of 100 MB and a second multiple image file assuming a data size of 20 MB may be generated through a single continuous shooting operation. Under these circumstances, if JPEG data amounting to 20 MB or more are deleted from the first multiple image file, a single multiple image file may be created by integrating the first multiple image file and the second multiple image file. In addition, the user may also be allowed to delete any JPEG data in multiple image files in the third and fourth embodiments and if the user has deleted JPEG data in multiple image files, a plurality of multiple image files may be integrated as long as the integrated multiple file does not exceed the single multiple image file limit as the file-splitting condition.

(6) In the first through fourth embodiments described above, the CPU 106 stores a series of sets of JPEG data obtained through a single shooting operation into a multiple image file. However, the present invention is not limited to this example and a batch of JPEG data made up with a plurality of sets of JPEG data obtained through an operation other than a continuous shooting operation may be recorded into a single multiple image file. For instance, the present invention may be adopted in conjunction with a batch of JPEG data made up of a plurality of sets of JPEG data obtained through a panorama photographing operation, a batch of JPEG data made up with a plurality of sets of JPEG data obtained through a time-lapse photographing operation, and the like.

(7) The present invention may also be adopted when some of the clusters in the memory card 110*a* have been used in the fourth embodiment. Namely, if some clusters in the memory card 110*a* have been used, a contiguous unused cluster cannot be procured within the memory card 110*a*. Under these circumstances, too, the current multiple image file may be closed with the write-back timing with which the size of the multiple image file becomes closest to the target size.

For instance, the memory capacity of the FAT memory 7*a* in the digital camera 100 may allow the FAT information for 256 MB data management to be recorded therein and the target size for each multiple image file may be 800 MB. In this situation, while FAT information with which recording of 256 MB data can be managed may be read out from the memory card 110*a* into the FAT memory 7*a* through a single FAT information read, the available data area will accommodate recording of less than 256 MB of multiple image file data if part of the 256 MB data area is already occupied.

For instance, if the 256 MB data area is only partially available to allow 200 MB data to be recorded therein and FAT information for 256 MB data management is read out into the FAT memory 7*a* through a single FAT information read, only 200 MB data can be recorded into the memory card 110*a* with the write-back timing with which the particular FAT information is written back. Namely, the multiple image file assumes the data size of 200 MB with the FAT information write-back timing. Subsequently, 220 MB data, 190 MB data and 170 MB data are assumed to be recorded respectively through the second write-back, through the third write-back and through the forth write-back.

Under these circumstances, the current multiple image file will assume a data size of 770 MB, closest to the target size of 800 MB, with the timing of the forth write-back. Accordingly, the CPU 106 will close the current multiple image file and open a new multiple image file with the timing with which the fourth write-back is completed. As an alternative, the current multiple image file may be closed and a new multiple image file may be opened with the timing with which the size of the current multiple image file exceeds the target size of 800 MB, i.e., with the timing with which the fifth write-back is completed.

(8) In the fourth embodiment described above, a separate multiple image file is created to split the current multiple image file by closing the current multiple image file based upon the timing with which FAT information in the FAT memory 7*a* is written back into the memory card 110*a* during the multiple image file recording operation. Instead, the CPU 106 may record data without creating separate multiple image files during the multiple image file recording operation and may split the data when the multiple image file data are reproduced. In more specific terms, as the CPU 106 records data into the multiple image file, it may partition the data in the multiple image file recorded in the memory card 110*a* with blank data with the timing with which FAT information in the FAT memory 7*a* is written back into the memory card 110*a*. Then, in response to a multiple image file reproduction instruction issued by the user, the CPU 106 may split this multiple image file at the positions of blank data to further create a plurality of multiple image files. As an alternative, instead of creating a separate multiple image file in correspondence to each set of blank data, a separate multiple image file may be created in correspondence to a predetermined number of sets of blank data.

(9) In the fourth embodiment described above, a separate multiple image file is created based upon the timing with which FAT information is written back into the memory card 110a from the FAT memory 7a in the digital camera 100. As an alternative, a separate multiple image file may be created based upon the capacity of the buffer memory, i.e., the SDRAM 107, in the digital camera 100. More specifically, a separate multiple image files may be created by closing the current multiple image file and writing the multiple image file data into the memory card 110a with the timing with which the buffer memory where the multiple image file is being created, becomes full.

(10) Separate multiple image files may be created through methods other than those described in reference to the first through fourth embodiments. For instance, if there is an upper limit to the number of thumbnail images that can be displayed at the LCD panel 105, a new multiple image file may be created to split the file each time image data corresponding to the maximum number of thumbnail images that can be displayed at the LCD panel are written into the current multiple image file. As an alternative, the current multiple image file may be closed and a new multiple image file may be opened after a predetermined length of time elapses during the photographic operation. In this case, the timing with which a separate multiple image file is created may be adjusted in correspondence to the intervals with which individual images are photographed by closing the current multiple image file each time a one-minute interval, for instance, elapses during the continuous shooting operation and closing the multiple image file each time a one-day interval, for instance, elapses in a photographing mode other than the continuous shooting mode, such as the normal photographing mode.

(11) In the first through fourth embodiment described above, JPEG data are generated through JPEG compression executed by the JPEG codec 108. However, the present invention is not limited to this example and it may be adopted in conjunction with image data generated in the GIF format or the TIFF format.

(12) In the first through fourth embodiments described above, photographing processing is executed in the digital camera 100 and the processing in FIG. 5 is executed by the CPU 106. However, the present invention is not limited to this example and it may be adopted in an apparatus other than the digital camera 100. For instance, it may be adopted in an apparatus such as a personal computer, which is connected to a digital camera through a wired connection or a wireless connection and generates image files by reading images photographed in the digital camera.

It is to be noted that as long as functions characterizing the present invention are not compromised, the present invention is in no way limited to the structures adopted in the embodiments described above. In addition, the present invention allows any of the embodiments described above to be adopted in combination with a plurality of variations.

What is claimed is:

1. An image file generation device, comprising:
an image file generation unit that generates an image file having stored therein a plurality of sets of image data obtained in a batch via an image sensor; and
an image recording unit that records the image file into a storage medium, wherein:
while the plurality of sets of image data are being obtained via the image sensor, upon a determination that a number of the obtained sets of image data reaches a maximum number of sets of image data that is displayed by a display device, the image file generation unit determines that an image file-splitting condition has been satisfied and ends image data storage into the current image file and starts image data storage into a new image file.

2. An image file generation device according to claim 1, wherein:
the image file generation unit determines that the image file-splitting condition has been satisfied when a data size of the image file exceeds a predetermined data size.

3. An image file generation device according to claim 1, wherein:
a FAT file system is adopted as a file system in the storage medium;
the image file generation device further comprises a FAT memory where FAT information read out from a FAT area in the storage medium is stored; and
the image file generation unit determines that the image file-splitting condition has been satisfied with timing with which the FAT information having been rewritten in the FAT memory while the image data are recorded into the storage medium is written back into the storage medium from the FAT memory.

4. An image file generation device according to claim 3, wherein:
the image file generation unit determines that the image file-splitting condition has been satisfied each time the FAT information in the FAT memory is written back into the storage medium.

5. An image file generation device according to claim 3, wherein:
the image file generation unit determines that the image file-splitting condition has been satisfied when the FAT information in the FAT memory has been written back into the storage medium a predetermined number of times.

6. An image file generation device according to claim 1, wherein:
a user is allowed to select a setting for the image file-splitting condition.

7. An image file generation device according to claim 1, wherein:
the batch of image data is a batch of image data made up with a plurality of image data obtained through a single continuous shooting operation.

8. An image file generation device according to claim 1, wherein:
the batch of image data is a batch of image data made up with a plurality of image data obtained through a single continuous shooting operation; and
the image file generation unit determines that the image file-splitting condition has been satisfied when a continuous shooting speed has become lower.

9. An image file generation device according to claim 8, further comprising:
a focus adjustment unit that executes focus adjustment, wherein:
the focus adjustment unit executes focus adjustment before starting the continuous shooting operation and when the continuous shooting speed has become lower.

10. An image file generation device according to claim 1, further comprising:
a deletion unit that deletes at least one set of image data among the plurality of image data stored in the image file in response to an instruction issued by the user; and
an integration unit that integrates a plurality of image files having been generated in correspondence to a batch of image data into a single image file by ensuring that the image file-splitting condition is satisfied if the deletion unit has deleted image data in an image file.

11. A camera, comprising:

an image sensor that obtains image data by capturing a subject image; and an image file generation device according to claim 1.

12. An image file generation method, comprising:

an image file generation step of generating an image file having stored therein a plurality of image data obtained in a batch via an image sensor; and an image recording step of recording the image file into a storage medium, wherein:

during the generation step, upon a determination that a number of the obtained sets of image data reaches a maximum number of sets of image data that is displayed by a display device, an image file-splitting condition is satisfied and image data storage into a current image file is ended and image file storage into a new image file is started.

13. A non-transitory computer-readable storage medium containing a program enabling a computer to execute an image file generation method according to claim 12.

\* \* \* \* \*